Aug. 11, 1953   W. O. LYTLE   2,648,753
TRANSPARENT CONDUCTING FILMS
Filed Dec. 15, 1951   3 Sheets-Sheet 1

INVENTOR.
WILLIAM O. LYTLE.
BY
Oscar L Spencer,
ATTORNEY.

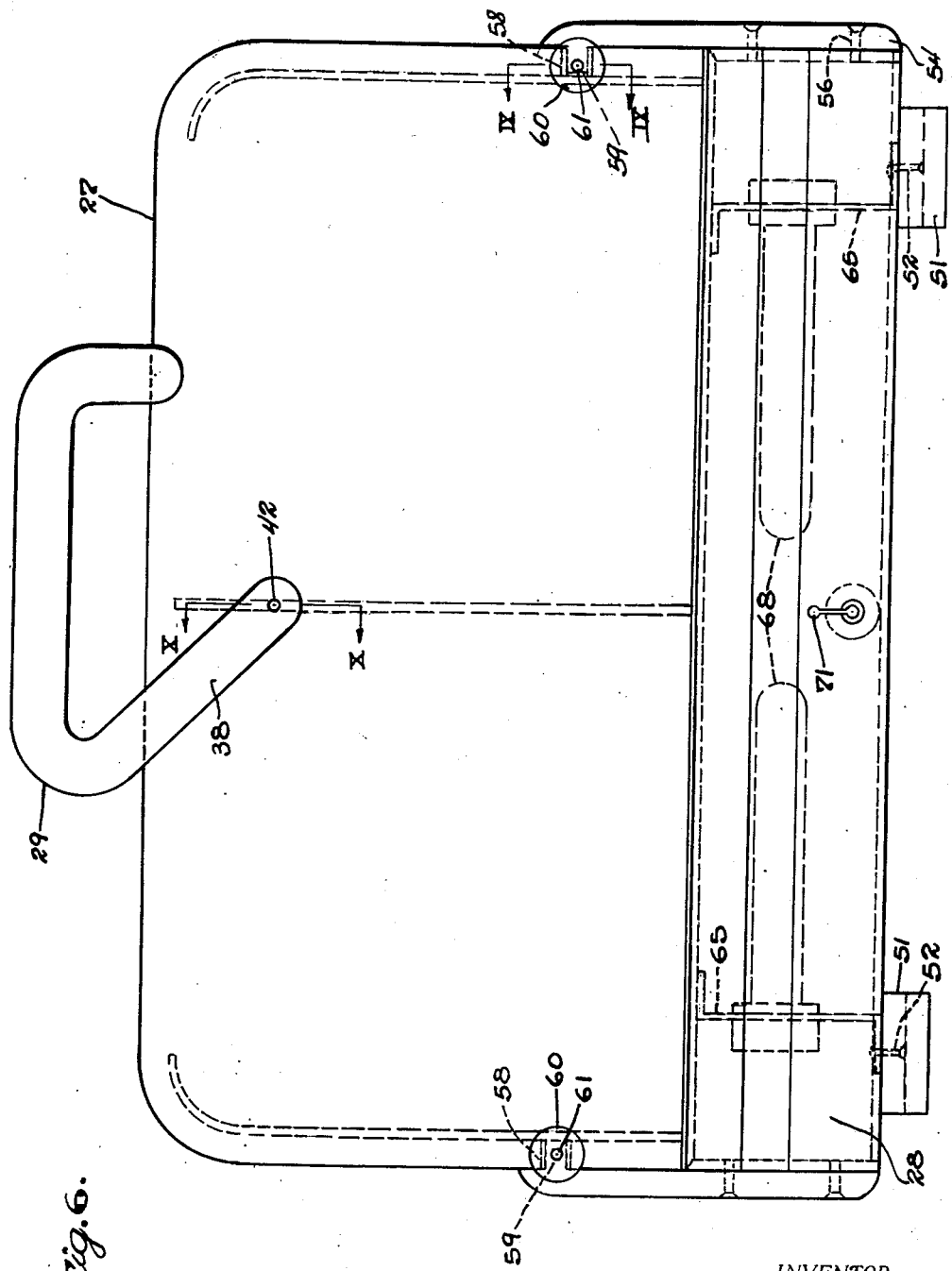

Aug. 11, 1953  W. O. LYTLE  2,648,753
TRANSPARENT CONDUCTING FILMS
Filed Dec. 15, 1951  3 Sheets-Sheet 3
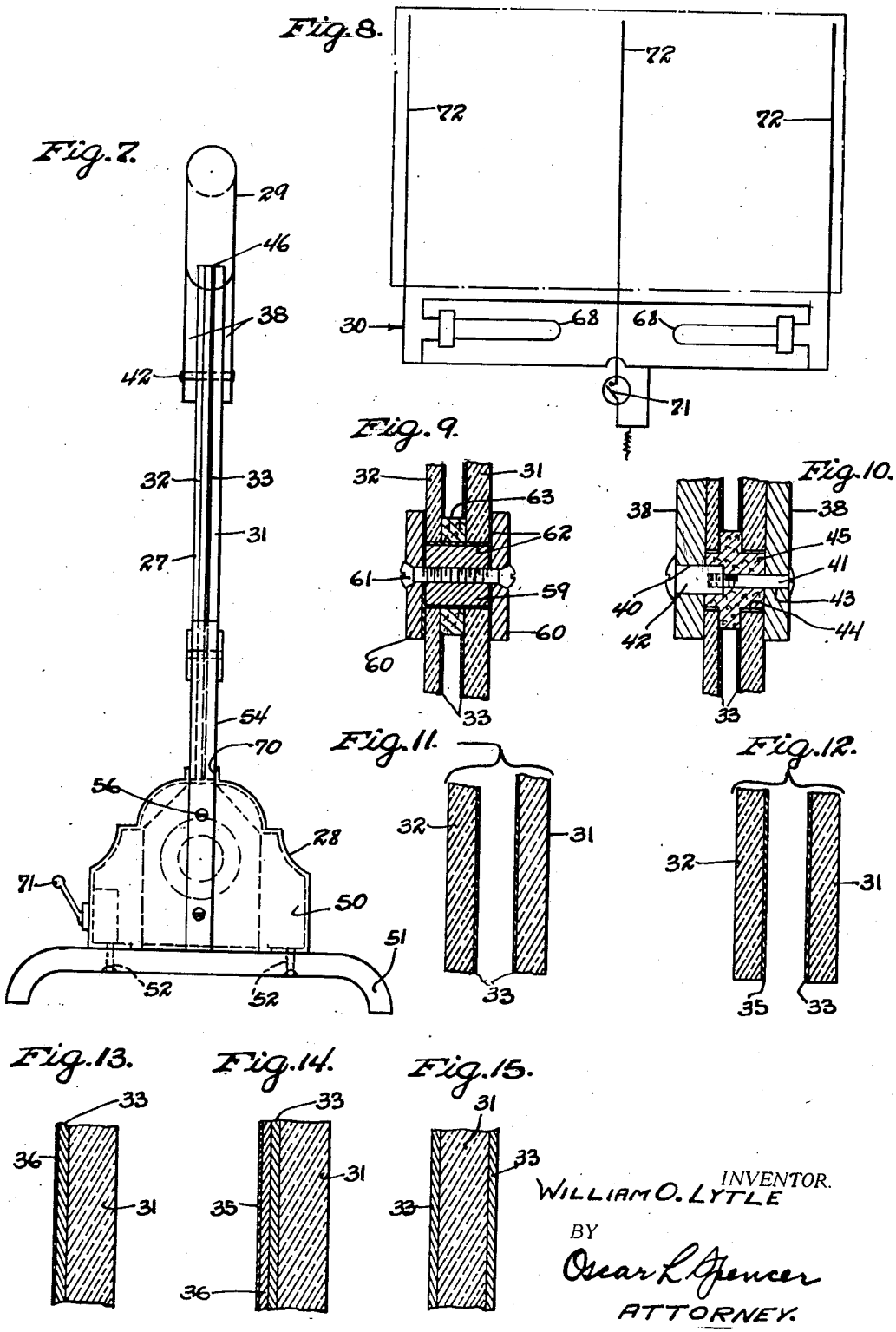
INVENTOR.
WILLIAM O. LYTLE
BY
Oscar L. Spencer
ATTORNEY.

Patented Aug. 11, 1953

2,648,753

UNITED STATES PATENT OFFICE 2,648,753

TRANSPARENT CONDUCTING FILMS

William O. Lytle, New Kensington, Pa., assignor to Pittsburgh Plate Glass Company, Allegheny County, Pa., a corporation of Pennsylvania Application December 15, 1951, Serial No. 261,766

12 Claims. (Cl. 219—19)

This invention relates to transparent electrically conducting films adherent to glass surfaces. More particularly, the invention relates to articles of transparent glass having at least one surface thereof coated with an adherent continuous film of low resistivity and low light dispersion properties, and to methods of forming such films on glass surfaces.

According to the present invention, novel types of electrical devices have been provided. These devices may be used for miscellaneous purposes, such as heaters, electrical condensers, viewing closures, and for other uses, as will become apparent from the ensuing disclosure. Various embodiments of the invention herein contemplated are illustrated in the accompanying drawings in which.

Figure 2:
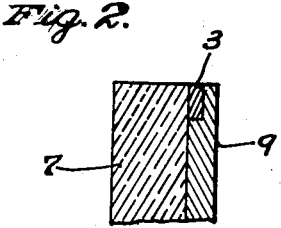
Fig. 2 is a diagrammatic fragmentary sectional view taken along lines II—II of Fig. 1.
Figure 3:
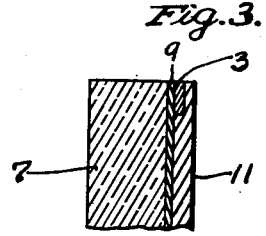
Figure 4:
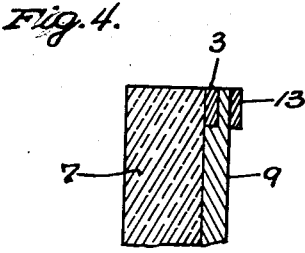
Figure 5:
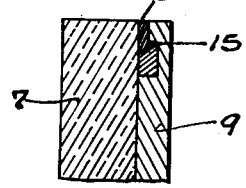

Figs. 3, 4, and 5 are diagrammatic sectional fragmentary views corresponding to Fig. 2 and illustrating other embodiments;

Fig. 6 is a side elevation of a portable decorative heating panel embodying the invention;

Fig. 7 is an end view of the panel shown in Fig. 6;

Fig. 8 is a schematic wiring diagram of the heater shown in Figs. 6 and 7;

Fig. 9 is a sectional view taken along the line IX—IX of Fig. 6, showing in detail the manner in which the transparent glass heating panel is attached to its base support;

Fig. 10 is another sectional view taken along the line X—X of Fig. 6, and showing in detail the manner of securing the handle to the panel;

Fig. 11 is a fragmentary sectional view illustrating the application of my conductive coating to glass sheets that may be utilized in one modification of the structure shown in Fig. 7;

Fig. 12 is a view similar to Fig. 11, showing a modification wherein the conductive coating of my invention is employed in conjunction with a reflecting surface to provide a panel for the unit shown in Fig. 7;

Fig. 13 is a sectional view illustrating the application of a non-conductive coating over the conductive coating of the invention; and Figs. 14 and 15 are fragmentary diagrammatic sectional views of composite structures constituting further embodiments of the invention.

Figure 1:
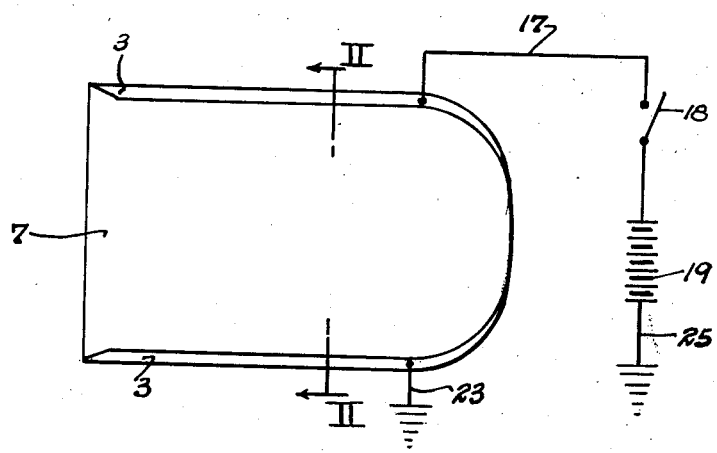
Fig. 1 is a diagrammatic plan view of a suitable electroconductive panel which is an element of the novel devices of this invention.

In the drawings, Figs. 1 and 2 diagrammatically illustrate a heating panel constructed according to the invention, and having the wiring diagrammatically illustrated. This panel comprises a glass sheet of generally rectangular shape having bus bars or conductive edge strips 3 of ceramic silver composition along opposite sides and close to the edges (preferably within 0.2 inch of the edge) of the sheet. These bus bars are disposed along the margins adjacent to the longest pair of opposite edges of the panel whereby the distance between the bus bars is held to a minimum. Alternatively, they may be disposed on the edges of the panel.

The panel is provided with an electroconductive transparent film 9 of tin oxide or other material, such as is described hereinafter. The bus bars are connected to a source of potential 19 by means of conductors 17, 23, and 25, one side of the potential source and one of the bus bars being grounded through conductors 25 and 23, respectively. The conductor 17 is provided with a suitable switch 18 for interrupting the flow of electric current to the film.

When the circuit is closed, electric current passes through the electroconductive transparent film and heat is generated by virtue of the resistance of the film. Usually, it is desirable to limit the temperature to prevent establishment of an average temperature above about 350° F. in order to avoid damage to, or loss of, conductivity of the film.

In accordance with a suitable method of preparing a heating panel of the type illustrated in Figs. 1 and 2, a glass sheet 7, usually of window or plate glass, is provided with conducting metal strips 3 suitable for bus bars on the margins adjacent to the edges thereof and a conducting transparent coating 9. As previously stated, these metal strips should adhere firmly to the glass sheet and should have total conductivity not less than 10 to 20 times that of the conductive coating 9. In the preferred embodiment, these metallized strips are produced by applying a metallized coating strip, usually 0.1 to 1 inch wide, upon the surface of the sheet to be treated and close to a pair of opposite edges thereof. This metallized coating must be capable of withstanding the temperatures and oxidizing conditions of treatment, and therefore should be of a ceramic or vitreous character and, further, should be capable of glazing or otherwise forming an adherent, well-bonded coating to the glass. In general, these compositions comprise a highly conductive metal powder and a vitrifying binder.

In order to avoid production of bus bars which will develop in use excessive stresses in the glass, the thickness of the coating to be applied should not exceed about 0.005 inch, and preferably should be below about 0.003 inch.

After application of the metal bus bars to the glass sheet by painting or other method, the sheet is heated to the temperature at which the binder is vitrified, and application of the conductive coating may be effected, for example, above about 600 to 800° F. but below the fusion point of the glass, usually 1,050 to 1,350° F. During this heating operation, the ceramic metal coating becomes glazed and is baked onto the glass so that a firm bond between the glass and the metal coating is established.

When the glass has been heated to a temperature above 800° F., for example, 1050 to 1250° F., it is withdrawn from the heating chamber and immediately is sprayed with the coating solution before substantial cooling of the glass sheet can take place. A typical solution which may be used for establishing the conductive coating herein desired consists of 100 parts by weight of fused $SnCl_4 \cdot 5H_2O$, 10 parts by weight of water, and 2.5 parts by weight of phenyl hydrazine hydrochloride. A quantity of this solution is placed in an atomizing spray gun and the heated glass sheet is sprayed with an atomized spray of this material for a brief period, usually of the order of 2 to 20 seconds, depending upon the thickness of the film to be produced, the air pressure imposed upon the atomizing spray gun, etc.

As a consequence of this spraying operation, a transparent conductive coating 9 is disposed upon the glass. This coating is shown in the drawing to extend over the surface of the bus bar. Frequently, however, the amount of film which is deposited upon the bus bar per se is so small as to be detectable only with difficulty if at all. The resistance of such coatings is found to be quite low, being less than 500 ohms per unit square. The expression of the resistivity of the film in terms of resistance per unit square is a convenient means of expressing the resistance of thin films; this resistance, in fact, being the specific resistivity of the film divided by the average thickness of the film within the unit square.

The film thus obtained also has an unusually low haze factor, being below about 5 per cent, as measured by a method designated "A tentative method of industry for transparent plastics by photoelectric cell," described in the publication "A. S. T. M. Standards," 1944, part 3, pages 1653-5, American Society Testing Materials, New York. Applicant has found that at least one of the causes of haze appears to be premature decomposition of the stannic chloride or other hydrolyzable compound which is used to deposit the conductive coating. Thus, applicant has determined that unless the conversion of the stannic chloride or similar compound to the corresponding metal oxide occurs immediately adjacent to or on the hot glass surface, minute particles of tin oxide or hydrated tin oxide tend to be formed in an opaque condition and to be swept onto the glass surface and entrapped by the depositing film. Avoidance of a high degree of haze may be attained by making certain that the atomized stannic chloride spray is impinged at high speed upon the glass surface.

Avoidance of haze may also be minimized by proper co-adjustment of the distance between the nozzle of the spray gun and the glass surface with the air preessure on the spray gun. Moreover, provision of means for rapid removal of the fog which is formed by the spraying operation and which is spaced from the plate to be treated frequently assists to prevent or minimize haze. Certain agents which may serve as reducing agents or catalysts, such as methanol, co-operate with the stannic chloride to produce a product of low haze and low resistivity. To some degree at least, these agents appear to function to minimize pre-decomposition. Further discussion of methods of avoidance or minimizing of haze appears to be unnecessary in the present application since these features are not of absolute essentiality insofar as the claims which are presented herein are concerned.

In accordance with a further embodiment, such as illustrated in Fig. 3, the glass base 7 may be provided with two or more conductive coatings 9, 11, etc. In such a case, it has been found to be more advantageous to deposit the first tin oxide coating upon the glass base and then to deposit the metallized bus bar, followed by deposition of the second tin oxide or similar conductive coating. In this embodiment, the bus bars are disposed between a pair of coatings. In either case, however, the bus bar is disposed between the glass base and the transparent conductive coating.

The invention herein also contemplates other embodiments. Typical additional embodiments are illustrated in Figs. 4 and 5. As illustrated in Fig. 4, it is frequently desirable to reinforce the ceramic metal bus bar with an additional metal coating after deposition of the conductive transparent film. This is particularly true where the transparent film is deposited as a single coat, although this embodiment is applicable even when a multiplicity of coatings are used. Thus, a glass base 7 may be provided with bus bars 3 and a transparent tin oxide coating 9, and thereafter a reinforcing coating 13 of a conductive metal paint or paste, such as an air-drying cement comprising a conductive metal powder, such as silver, copper, gold, etc., and an air-drying binder (linseed oil, air-curing resins, etc.) may be deposited upon the bus bar or the coating over the bus bar. Furthermore, a reinforcing layer of copper, silver, or other conductive metal may be deposited by other means, such as by electrodeposition, cathode sputtering, dipping, spraying, etc. This reinforcement very substantially improves the conductivity and electrical contact between the bus bar and the conductive transparent coating.

Fig. 5 illustrates an embodiment which is particularly adapted for the establishment of superior electrical contact between the bus bar and the coating. I have found that, when silver is used as the bus bar material, the deposition of the conductive tin oxide or similar coating appears to be hindered and a tendency exists for the coating to be substantially thinner immediately adjacent to the silver bus bar. This reluctance of the conductive film to deposit adjacent to the silver frequently results in the establishment of localized areas having an unusually high resistance immediately adjacent to the bus bar.

According to the present invention, it has been found that when gold is used as the bus bar material, this difficulty is not encountered and consequently the substitution of gold for silver sometimes is resorted to. However, in order to conserve the amount of gold used, applicant has found that an advantageous avoidance of the thinning out of the coating may be attained by use of a very narrow coating of gold along the inner edge of the bus bar. As shown in Fig. 5, a glass base 7 is provided with the usual silver metal bus bar 3, and a narrow strip 15 of gold is deposited along the inner edge of the bus bar 3 which may extend inward and overlap or cover the edge of the bus bar 3. Thereafter, the transparent coating 9 is deposited in the usual manner, the coating being in contact with the gold strip 15 rather than the bus bar 3.

In Figs. 2 to 5, inclusive, the tin oxide or similar electroconductive transparent coatings 9 and 11 are shown as thinning out over the bus bars 3. This showing is purely diagrammatic. As previously noted, only a slight amount of tin oxide tends to deposit upon the bus bar itself. Often, a clearly detectable deposit of the oxide coating on the bus bar may be observed. In other cases, the deposit may be so slight as to be unobservable.

In many instances, it is advantageous to provide a non-conducting, transparent coating directly over the conducting film of the invention which, in turn, adheres to the glass surface. In certain applications of the invention, such a non-conducting coating shields the conductive film from contact with external forces which may tend to impair the conductivity thereof or which, on the other hand, may be harmed by contact with the conductive film when it is at a potential differing from the ground.

In certain specific embodiments of the invention, a single transparent glass panel coated with a conductive film is employed as a heating element and there is risk of the element being contacted by human beings. In such instances, for example, in portable room heaters or in windows for autos and other vehicles, when the voltage is made sufficient to span an appreciable distance between electrode terminals, the conductive film of the invention may be at sufficient potential to give an appreciable shock. When a non-conductive coating is applied over the exposed surface of the conductive film, the appliance is rendered safe.

An additional advantage may be obtained in the employment of non-conductive coatings in conjunction with the conductive coatings above described. Thus, the conductive coatings of the invention, when thin enough to avoid excessive haze, are in the range of thickness which inherently produces iridescence. Where two-way vision is desired through a viewing closure, such iridescence can be an annoying factor since it is particularly noticeable in reflected light. According to a preferred embodiment of my invention, a conductive film produced as above described is further coated with a non-conductive film having an index of refraction approximately the same as the conductive coating and of such thickness as to build up the combined film on the glass surface to a point where it is no longer iridescent.

In forming non-conductive films over the conducting films heretofore described, I reheat the conductively coated glass surface to a temperature between 1000 and 1500° F., for example, 1150° F., and spray the conductive surface with a coating fluid which will yield a non-conductive, abrasion-resistant film. By way of example, I have produced non-conductive coatings over the conductive coatings heretofore described by employing apparatus similar to that described, with a 5 per cent solution of aluminum chloride in water, after which the coated glass panel was allowed to cool. When 5 milliliters of a solution of aluminum chloride is so applied, the exposed surface is rendered non-conductive, but the combined film formed is not sufficiently thick to avoid iridescence under reflected light. However, by repeated or continued application of the non-conductive film-forming fluid, the film can be rendered sufficiently thick to cause the iridescence to disappear entirely.

Various siliceous solutions form excellent coating fluids for the production of non-conductive films. Thus, I have successfully employed a hydrolyzed silica sol formed by peptizing ethyl silicate in aqueous solution by the addition of HCl. Sols formed from other organic silicates or the poly-silicates are equally suitable. On application under the conditions above recited, such siliceous solutions form hard, abrasion resistant, transparent, non-conductive films. Likewise, organic silicates can be applied to cold surfaces and then fired to increase their stability. Solutions of silicon, titanium, and iron chlorides can be used under controlled conditions as coating solutions to form non-conductive films in the manner above described.

A useful embodiment of the invention is depicted in Figs. 6 to 13, inclusive, where I have shown a portable electrical room heater of pleasing appearance and unique design. The heater embodies, in general, a glass heating panel 27, a base or supporting structure 28, and an electrical system 30. In the form illustrated, the heating panel 27 is planar and oblong with rounded upper corners. Advantageously, the panel may consist of two parallel sheets of glass 31 and 32, each coated on its inner face with a conducting transparent coating 33 (Fig. 11).

Alternatively, only one of the sheets may be coated with the conductive coating, as shown in Fig. 7, or one of the sheets may be coated with the conductive coating 33 and the other with a polished metallic reflecting or mirroring surface 35 (Fig. 12). If desired, the heating panel 27 may be constructed of a single sheet of glass 31 which is provided with the adherent continuous conducting coating 33 on one surface and with a non-conductive layer 36 superposed thereon, as shown in Fig. 13. When it is desired to provide a reflection type of heater, a metal layer 35, preferably having a mirror surface, may be formed adjacent the non-conducting layer 36, as shown in Fig. 14. This layer 35 may be a pre-formed metal sheet or foil, or may be a sprayed or otherwise formed metal coating.

Reverting to the embodiment shown in Figs. 6 to 9, inclusive, the handle 29 is conveniently constructed of metal tubing, of wood or plastic, and has a bifurcated portion comprising arms 38 which are provided with registering openings 40 and 41 to accommodate a clamping sleeve 42 and a bolt 43 threaded into the sleeve. The panel plates 31–32 are likewise provided with enlarged registering openings 44 which accommodate a fibre bushing 45. At the opposite terminus of the handle, a recess 46 is formed to provide a pressed fit over the edge of the panel 27.

The base portion 28 consists of a metal housing 50 resting upon transverse feet 51 that are fastened rigidly thereto, as indicated at 52. Upright bracing standards 54 are secured, as indicated at 56, to the opposite ends of the housing, and they confine opposite upright edges of the panel 27 to insure a rigid structural assembly.

Adjacent the upper ends of the standards, at locations intermediate the height of the panel 27, notches 58 are formed in the marginal portions of the glass plates to receive integral projections 59 of the standards. Metal discs 60 are clamped upon opposite sides of the panel by means of bolts 61 which are threaded into the projections 59 and extend through the notches 58. Suitable cushioning packing 62 (Fig. 9) can be applied to the joint formed by these discs and fastening elements, and a buffer 63 of cushioning and heat resistant compound is disposed between the glass sheets around the projections 59. Thus, the glass is cushioned against the action of the clamping structure but is held rigidly by the standards 54.

Upright sheet metal supports 65 in the housing are held rigidly by means of the fasteners 52 and are provided with sockets to receive light bulbs 68 which illuminate the panel from below. The housing 50 has an upper longitudinal slot 70, as shown in Fig. 6, in which the lower marginal portion of the panel is set so that the glass will be subjected directly to the rays of light from the bulbs.

Referring to Fig. 8, an electric potential is supplied to the wiring system 30 through a conventional two-wire cord which is illustrated diagrammatically. This system includes a switch 71 which is operable to turn on the light bulbs 68 and to energize the conducting coating or film on the glass of the panel 27. In order to facilitate this action, bus bars 72 are included in the electric system. These bars are composed of thin metal ribbons adhered to the glass plates in contact with the conducting coating. Two or more bus bars or ribbons of metal can be applied, as indicated in Fig. 6. More specifically, these bus bars can be applied to the glass as narrow strips in the manner heretofore described in connection with the panel shown in Fig. 1.

According to a further embodiment, as illustrated in Fig. 15, the glass or like refractory panel 31 may be provided with transparent electroconductive coatings 33 on both sides of the panel. In such a case, both coatings may be used as heating elements electrically connected either in series or in parallel relationship with each other.

The electric potential applied across the electroconductive coating may be alternating or direct current.

It should be understood that the electroconductive panels are suitable for many uses other than for heating. For example, if an alternating current potential is applied between the film 33 and the metal coating 35 (Fig. 14) or between the coatings 33 on panels 31 and 32 (Fig. 11) or between the coatings 33 on opposite sides of panel 31 (Fig. 15), the units illustrated function as electrical condensers in which the coating is separated from the metal layer or another coating by air, glass, or like non-conductor which functions as a dielectric. In such a case, the non-conductor may be transparent or opaque. Such transparent electrical condensers may be used in various electrical circuits.

When the panels are used as condensers, the electric potential may be applied to the transparent electroconductive coating in any conventional manner. Frequently, the opposed bus bars, on opposite edges of one coating 33 disposed on a panel 31, may be connected to the same side of a source. In such a case, the other coating (Fig. 15) or the metal coating (Fig. 14) or the coating 33 on panel 32 (Fig. 11) may be connected to the opposed side of the electrical potential source.

Where the non-conductor 36 contains an electron responsive material which glows or fluoresces upon actuation with electrons, and an alternating electric potential is established between the metal reflector 35 and the film 33, the electron responsive material emits light which is reflected through the glass by the reflecting surface of the metal coating or sheet 35.

The electroconductive films herein contemplated, which range in thickness from 5 to 800 or 1000 millimicrons or even higher, may be deposited by various methods. Where tin oxide coatings are desired, they may be deposited according to any of the following additional examples:

EXAMPLE I

In a series of tests, polished plate glass sheets, 4 inches by 8 inches by 7/64 inch, were heated for 2¼ minutes at a furnace temperature of 1250° F. Stannic chloride solutions were made up using the agents listed below in the proportion of 10 parts by volume of the agent to 5 parts by weight of stannic chloride pentahydrate. Fifteen grams of each mixture was sprayed upon the heated glass plates and the plates were allowed to cool. Average resistances of the coatings were as follows:

| Agent | Resistance, Ohms per unit square | Appearance |
| --- | --- | --- |
| Methanol | 100 to 200 | Clear. |
| Ethanol | 150 to 300 | Do. |
| N-propanol | 160 to 300 | Do. |
| Isopropanol | 75 to 150 | Slight haze. |
| Isobutanol | 100 to 300 | Clear. |
| Isoamyl alcohol | 150 to 300 | Do. |
| Methyl amyl carbinol | 100 to 200 | Do. |
| Cyclohexanol | 200 to 400 | Slight haze. |
| Cellosolve | 150 to 300 | Clear. |
| Butyl carbitol | 150 to 300 | Do. |
| Cellosolve acetate | 110 to 300 | Slight haze. |
| Carbitol acetate | 250 to 350 | Do. |
| Methylene dichloride | 100 to 250 | Clear. |
| Ethylene chlorohydrin | 300 to 1,000 | Do. |
| Dipentene | 140 to 250 | Do. |
| Thionyl chloride | 100 to 150 | Do. |
| Hydroxyl amine | 100 to 150 | Do. |

Other agents, including the following, produced coatings, when used according to the process of Example II, which had resistances of 50 to 400 ohms per unit square:

Diacetonyl alcohol  1-nitropropane
Diethyl ketone  Formic acid
Methyl isobutyl ketone  Methyl amyl acetate
Cyclohexanone  Ethyl ether
Methyl acetate  Triamyl amine
Ethyl acetate  Butyl ether
Butyl acetate  Cellosolve acetate
Butyl butyrate  Carbitol acetate
Amyl acetate  Methyl Cellosolve acetate
Nitro methane  Propylene glycol Somewhat higher resistances are obtained using agents such as:

Acetic anhydride
Glacial acetic acid
t-butyl perbenzoate

Solid precipitates are formed when stannic chloride is reacted with agents such as furfuryl alcohol, isophorone, dipentene or monomethyl amine, triamyl amine or other alkyl amines. These precipitates may be rubbed on glass plates heated to 1200° F. and a clear coating can be produced.

EXAMPLE II

An aqueous solution comprising 4 grams of stannous acetate, 30 milliliters of methanol, and enough 12 N (37%) aqueous HCl to cause the stannous acetate to dissolve was prepared. This solution was allowed to stand or age in air overnight. Five milliliters of the aged solution was sprayed in five seconds from an atomizing nozzle at an air pressure of 30 p. s. i. and the spray directed against a glass sheet 8 inches by 4 inches by 7/64 inch which had been subjected to a furnace temperature of 1250° F. for 2¼ minutes. Upon removal of surface powder by brushing the treated sheet after cooling, a very clear adherent essentially colorless coating was found to be present on the glass. This coating was approximately 50 to 75 millimicrons in thickness. Its conductivity was 650 to 700 ohms per unit square.

EXAMPLE III

A battery of three De Vilbiss spray guns, capable of spraying an atomized spray of oval cross-section, were mounted in a row so that their nozzles were directed substantially in a horizontal plane toward a focal point essentially as shown in Figs. 13 to 15 inclusive. The two outer guns were directed so that the angle between the nozzles was approximately 30 degrees. The middle gun was mounted so that the nozzle was directed toward the focal point of the outer nozzles and approximately bisected the angle between the two outer nozzles. Each of the nozzles was mounted so that the end of the nozzle was approximately 11 inches from the focal point.

A sheet of glass 17 x 25 x 7/64 inches was vertically suspended, narrow sides being in a horizontal plane, and was heated in a furnace chamber at a temperature of 1150° F. for 3 minutes. The two outer guns were filled with a solution prepared by mixing the following components in the proportions specified:

Stannic chloride pentahydrate _____ grams__ 900
Methanol _____ milliliters__ 63
Phenyl hydrazine _____ grams__ 21
Dioctyl sodium sulfosuccinate
  solution _____ do____ 30
  This solution composed of—
    Dioctyl sodium sulfosuc-
      cinate _____ grams__ 10
    Methanol _____ ml__ 45
    Water _____ ml__ 43

Spray guns were turned on; the air pressure imposed in the two outer guns being 80 pounds per square inch and in the middle gun 80 pounds per square inch. The middle gun was left empty. In consequence, the spray from the two outer guns impinged and caused the spray to fan out in a vertical direction whereby a relatively narrow high speed stream of spray of rectangular cross-section was produced. This stream was blown forward by the blast of air from the middle nozzle.

Immediately after the heating period, the glass sheet was held vertically with its front face perpendicular to the middle nozzle, and was moved across the spray so that the guns were directed to a point midway between the top and bottom edges of the sheet. The sheet was held approximately 4 inches from the focal point. Under these conditions, a long thin band of spray was blown against the hot glass surface forming a coating as the sheet moved across the spray.

The air blast from the middle nozzle caused rapid movement of the spray toward the sheet whereby conversion of stannic chloride to tin oxide, before the spray struck the sheet, was substantially minimized. Furthermore, the air blast aided in creating a draft across the sheet toward the side edges thereof, thus minimizing the opportunity for fog created by the spray from contacting the sheet and rapidly removing excess and partially decomposed spraying solution from the surface of the sheet. This process substantially minimized haze.

The rate of moving the sheet across the spray was such as to require approximately 6 seconds. During this period, approximately 20 cc. of solution was sprayed from each gun. Following the spraying operation, the sheet was tempered to a temper of approximately one-fourth that of full temper.

The resulting sheet had a transparent iridescent tin oxide coating which had a resistivity of approximately 125 ohms per unit square. The thickness of the coating was approximately 350–400 millimicrons.

EXAMPLE IV

A glass plate, six inches square and 7/64 inch thick, of plate glass having the following composition:

| | Per cent by weight |
|---|---|
| $SiO_2$ | 71.52 |
| $Na_2O$ | 13.02 |
| CaO | 11.62 |
| MgO | 2.52 |
| $NaSO_4$ | 0.76 |
| Nacl | 0.12 |
| $Fe_2O_3$ | 0.11 |
| $Al_2O_3$ | 0.33 | was heated on a hot plate until the under surface of the plate was at a temperature of 600° C. Heating at this temperature was continued throughout the process.

Approximately 100 cubic centimeters of stannic chloride was placed in a receptacle having a volume of about 500 cubic centimeters, and the stannic chloride was heated to 105° C. Approximately 100 cubic centimeters of anhydrous methanol was placed in a 500-cubic centimeter flask and heated to 50° C. A stream of dry air was passed over the heated stannic chloride at a rate of 30 cubic centimeters of air per second, and a separate stream of dry air was placed over the heated ethanol at a rate of 3 cubic centimeters per second. These air streams, which were slightly below saturation as to their respective vapors, were mixed and the mixture was allowed to flow directly through a ¼ inch pipe which was directed downwardly toward the upper surface of the heated plate (which was supported horizontally) at one end of the plate and at an angle of about 30 degrees from the horizontal and in the direction of the opposite end of the plate. A suction was applied at the opposite end of the plate. By this means, the mixture of air, stannic chloride, and alcohol was distributed laterally of the nozzle and caused to flow across the plate. The effect of the suction is to remove tin oxide and similar compounds which are produced at points spaced from the glass surface and thereby to minimize haze formation.

The flow of air and stannic chloride and alcohol vapor was continued for 60 seconds during which the vapor mixture flowed over the hot glass plate and a transparent tin oxide coating which exhibited interference colors was found. Upon cooling, the glass was found to have a conductive transparent film therein which was $540 \times 10^{-7}$ centimeters in thickness. This coating had a specific resistance of about $2 \times 10^{-3}$ ohm centimeters.

When this process was repeated omitting the alcohol, a glass plate having a coating which had a specific resistance of above $10 \times 10^{-3}$ ohm centimeters was obtained.

EXAMPLE V

The process of Example IV was repeated using several other liquids in lieu of methanol, using the conditions of Example IV except as otherwise specified in the following table:

TABLE I

| Agent used in lieu of anhydrous methanol | Temperature of agent, ° C. | Ratio of air flow over $SnCl_4$ to air flow over agent | Time of treatment (seconds) |
|---|---|---|---|
| Acetone | 50 | 10 to 1 | 60 |
| Benzene [1] | 65 | 10 to 1 | 60 |
| Carbon tetrachloride | 65 | 10 to 1 | 60 |
| Acetylene [2] | 25 | 2 to 1 | 60 |

[1] Nitrogen used in lieu of air.
[2] Nitrogen used in lieu of air and the mixture comprised approximately 50 parts by volume each of acetylene and nitrogen.

In the above tests, the products produced were found to have a transparent coating which had conductivity substantially equal to that of the product of Example IV.

The invention has been described with special reference to the use of stannic chloride as the tin compound for production of the electroconductive film. This compound is particularly valuable since it may be used either in aqueous medium or in vapor state to produce films which visibly appear to be flawless. Other stannic compounds, such as stannic bromide, $SnBr_3Cl$, $SnBrCl_3$, $SnCl_2I_2$, $SnI_4$, stannic sulphate, stannic phosphate, stannic nitrate, or stannous salts, such as stannous acetate, stannous oxalate, stannous chloride, stannus nitrate, and stannous tartrate may be used. Organic tin compounds also may be used. Such compounds may include those having the structure $R_mSnX_n$ where R is a monovalent aryl, aliphatic or arylaliphatic radical linked to the tin atom through carbon, and X is another monovalent aryl, aliphatic or arylaliphatic radical linked to the tin atom through carbon, or is a radical such as hydride, hydroxyl, chloride, bromide, iodide, etc., and the sum of $m$ and $n$ is 4, such as tetra ethyl tin, tetra methyl tin, tetra-n-heptyl tin, tetra-di-amyl tin, tetra-benzyl tin, tetra-phenyl tin, tetra-p-tolyl tin, tetra-p-xylyl tin, tribenzyl ethyl tin, tribenzyl tin chloride, tributyl tin chloride, triethyl-n-amyl tin, tolyl tin trichloride, ethyl tin tribromide, ethyl stannic acid, ethyl chlorostannic acid, diethyl tin oxide. Moreover, other tin compounds, such as diphenyl tin, diethyl tin, stannic bis acetylacetone dichloride or dibromide, etc. may be used.

In general, it is desired to use tin compounds which are liquid or which may be vaporized readily or which may be dissolved in solvents such as water or organic solvents, such as benzene, xylene, toluene, acetone, methanol, ethanol, methyl ethyl ketone, etc., in order that the tin compound may be applied to the base as a homogeneous liquid or solution. Such solutions normally contain at least 10 to 50 parts by weight of tin compound per 100 parts by weight of solution.

According to a further embodiment, mixed oxides may be applied. For example, an aqueous solution containing the usual amount of stannic chloride or other tin compound may have dissolved therein or mixed therewith compounds of other metals, such as indium chloride, cadmium bromide, cadmium acetate, zinc bromide, zinc acetate, thallium nitrate, chromium chloride, ferric chloride or other compounds of these metals, to modify the properties of the film. As a typical embodiment, 10 to 500 per cent by weight of thallium nitrate or cadmium chloride or acetate, based upon the weight of stannic chloride in the solution, may be added to the solutions of Examples I, II, and III, adding sufficient water if necessary to dissolve the mixture, and these solutions may be used in lieu of the solutions described in such examples.

In accordance with a further modification of the invention, conductive transparent or opaque metal oxide films prepared from hydrolyzable compounds of other metals may be used. For example, cadmium salts, such as cadmium chloride, cadmium acetate, cadmium bromide or cadmium formate may be dissolved in a solvent such as water or methanol, and the solution sprayed onto hot glass as herein described. Such a process produces a glass article having a cadmium oxide conductive film.

Electroconductive films also may be produced using compounds of other metals, such as the chlorides, bromides, acetates or nitrates of gold, thallium, indium, lanthanum, lead, magnesium, molybdenum, selenium, strontium, tungsten, etc. Furthermore, certain of these metals may be deposited in elemental state by a vapor deposition or sputtering process to produce a transparent electroconductive film, or such films may be oxidized to the oxide to produce films suitable for use in the present invention.

Such films can be deposited according to the following examples:

EXAMPLE VI

A polished plate glass sheet of lime-soda glass 4 inches by 8 inches by $7/64$ inch was heated for $2\frac{1}{4}$ minutes at a furnace temperature of 1250° F. and suspended vertically in atmospheric air of normal humidity. Twenty grams of a saturated aqueous solution of cadmium acetate was sprayed upon the heated glass plate, at a pressure of about 40 pounds per square inch, from a conventional atomizing spray gun, and the plate was allowed to cool. The glass plate which was thus obtained had an electroconductive film which was transparent and which had a resistance of 150 ohms per unit square, the specific resistivity of the film being about 0.005 ohm-centimeters. The glass thus obtained was quite clear and transparent, having a light yellow cast.

EXAMPLE VII

The process of Example VI was repeated using a mixture of a saturated aqueous solution of cadmium bromide and 30 per cent hydrogen peroxide aqueous solution, in the proportions of 2 parts by volume of the cadmium bromide solution to 1 part by volume of the peroxide solution. An adherent transparent coating was deposited on the glass base as in Example VI, and a transparent glass sheet was obtained having greater clarity and slightly less conductance than that of the product of Example VI.

Other oxidizing agents, such as perchloric acid and similar oxidizing agents, may be used in conjunction with or in lieu of the hydrogen peroxide. When cadmium nitrate and cadmium formate were used in lieu of cadmium bromide or cadmium acetate in the above examples, an electroconductive film was obtained but the film was considerably less adherent to the glass base.

The following examples are illustrative of suitable methods of producing the products herein contemplated:

EXAMPLE VIII

A polished plate glass sheet of lime-soda glass, 4 inches by 8 inches by 7/64 inch (4" x 8" x 7/64") was heated for 2 minutes at a furnace temperature of 1150° F., and immediately thereafter was suspended vertically in atmospheric air of normal humidity (containing about 0.003 to 0.006 pound of water per pound of air). Fifteen cubic centimeters of an aqueous solution of indium trichloride, containing 200 grams of indium trichloride per liter of solution, was immediately sprayed upon one side of the heated glass plate, at a pressure of about 40 pounds per square inch, from a conventional atomizing gun, and the plate was allowed to cool.

The glass plate thus obtained had an iridescent, electroconductive film approximately 500 millimicrons in thickness. This film was transparent and had a surface resistivity of about 200 ohms per unit square, in the specific resistivity of the film being about 0.01 ohm-centimeters. The glass thus obtained was quite clear and transparent.

EXAMPLE IX

A glass plate was provided with a coating of indium metal having a thickness of about 100 millimicrons by conventional vapor metal technique. The deposit was effected by placing the glass plate in a chamber, maintaining the vapor pressure within the chamber at 0.1 micron, and vaporizing indium metal by placing indium metal slivers upon a tungsten wire within the chamber and electrically heating the wire.

The coated glass plate was heated in atmospheric air at 1100° F. for 5 minutes. The resulting film was transparent and had a specific resistivity of about 0.05 ohm-centimeters. Films having resistivities of 0.002 to 0.006 ohm-centimeters may be produced by heating the indium metal coated glass at a subatmospheric air or oxygen pressure, for example, 100 microns of mercury or other pressure, preferably below 10–100 millimeters of mercury.

EXAMPLE X

Glass plates were heated to 1250° F. and were sprayed with the solutions set forth in the table below, in an amount sufficient to produce films having a thickness of 100 millimicrons and, after cooling to room temperature, the specific resistivities of the film were observed. The results obtained were as follows:

*Table II*

| Solution No. | Solution Composition (percent by weight) | | | | Film Resistivity, Ohm Centimeters |
| --- | --- | --- | --- | --- | --- |
| | InCl | Solution A | Methanol | Water | |
| 1 | 11.5 | 1.0 | 84.0 | 3.5 | 0.0002 |
| 2 | 22.7 | 1.96 | 75.4 | 0. | 0.00025 |
| 3 | 7.7 | 0.66 | 89.3 | 2.32 | 0.00017 |

Solution A had the following composition:
 Anhydrous stannic chloride, 1000 cubic centimeters.
 Anhydrous methanol, 2000 cubic centimeters.
 Ammonium acid fluoride, 60 grams.
 Butyl Carbitol acetate, 3000 cubic centimeters.

EXAMPLE XI

Glass plates are heated to 1250° F., and are sprayed with a saturated anhydrous methanol solution of indium trichloride to produce a film having a thickness of 100 millimicrons. The specific resistivity of the resulting film was 0.02 to 0.05 ohm-centimeters. Addition of small amounts (about one per cent by weight, based upon the weight of indium trichloride) of several agents to the methanol solutions produced films having specific resistivities as follows:

| Agent Added | Specific Resistivity |
| --- | --- |
| $SnCl_4$ | 0.0005 ohm-centimeters. |
| Stannic chloride pentahydrate | 0.0003 ohm-centimeters. |
| $H_2F_2$ (as aqueous hydrofluoric acid containing 48% by weight $H_2F_2$). | 0.0009 ohm-centimeters. |
| Antimony trichloride | 0.0005 ohm-centimeters. |
| $SnCl_4.5H_2O+H_2F_2$ | 0.0017 ohm-centimeters. |

Although the present invention has been described with particular reference to the details of certain embodiments thereof, it is not intended that such details shall be regarded as limitations upon the scope of the invention except insofar as imposed by the accompanying claims.

This application is a continuation-in-part of my copending applications Serial Nos. 669,535 and 762,659, filed May 14, 1946 and July 22, 1947, respectively, the former having matured into Patent No. 2,583,000, dated January 22, 1952.

What is claimed:

1. An electric heating device which comprises a vitreous ceramic body having on a surface thereof an electrically conducting iridized metal oxide film integrally united with such surface and having an electrical resistance of less than 1000 ohms per square and, superposed on said film and integrally united therewith, a second iridized metal oxide film having a different composition and a higher electrical resistance than the first film, said body being provided with spaced metallic members in electrical contact with the film integrally united with the surface of such body.

2. An electrical heating device which comprises a vitreous ceramic body having on a surface thereof an electrically conducting iridized metal oxide film integrally united with such surface and having an electrical resistance of less than approximately 1000 ohms per square and, superposed on said film and integrally united therewith, a second iridized metal oxide film having a different composition and a higher electrical resistance than the first film, said body being provided with electrical conductor means in electrical contact with the film integrally united with the surface of such body.

3. An electrical heating device which comprises a vitreous ceramic body having on a surface thereof an electrically conducting iridized metal oxide film integrally united with such surface and having an electrical resistance of less than approximately 1000 ohms per square and, superposed on said film and integrally united therewith, a second film having a different composition and a higher electrical resistance than the first film, said second film being composed of a member selected from the group consisting of a hydrolyzed silica sol, an organic silicate and an iridized metal oxide; said body being provided with electrical conductor means in electrical contact with the film integrally united with the surface of such body.

4. An electrical device comprising a vitreous ceramic body having on a surface thereof a transparent electrically conductive film integrally united with such surface, said film having an electrical resistance of less than approximately 1000 ohms per square and a thickness within the range wherein said film is iridescent; and, superposed on said film and integrally united therewith, a second transparent film having a different composition and a substantially higher electrical resistance than the first film, said second film having an index of refraction approximately the same as that of the first film, the combined thickness of said first and second films being within the range wherein said device is substantially free from iridescence, said body being provided with electrical conductor means in electrical contact with the film integrally united with the surface of said body.

5. An electrical device as set forth in claim 4 wherein the transparent electrically conductive film integrally united with the surface of said body is a transparent metal oxide film having a thickness of less than approximately 1000 millimicrons.

6. An electrical device as set forth in claim 4 wherein the second transparent film is a transparent hydrolyzed silica sol.

7. An electrical device as set forth in claim 4 wherein the second transparent film is a transparent organic silicate.

8. An electrical device as set forth in claim 4 wherein the second transparent film is a transparent oxide of silicon.

9. An electrical device as set forth in claim 4 wherein the second transparent film is a transparent oxide of titanium.

10. An electrical device as set forth in claim 4 wherein the second transparent film is a transparent oxide of iron.

11. An electrical device as set forth in claim 4 wherein an electrically conducting metal layer is superposed on and integrally united with said second transparent film.

12. An electrical device comprising a vitreous ceramic body having on a surface thereof an electrically conducting transparent metal oxide film integrally united with such surface and superposed on said film a second and non-conductive transparent film having a different composition than the first film, an electrically conducting metal layer superposed on said second film, said body being provided with electrical conductor means in electrical contact with the film integrally united with the surface of said body.

WILLIAM O. LYTLE.

References Cited in the file of this patent

UNITED STATES PATENTS

| Number | Name | Date |
|---|---|---|
| 2,119,680 | Long | June 7, 1938 |
| 2,429,420 | McMaster | Oct. 21, 1947 |
| 2,513,993 | Burton | July 4, 1950 |
| 2,564,677 | Davis | Aug. 21, 1951 |

FOREIGN PATENTS

| Number | Country | Date |
|---|---|---|
| 606,894 | Great Britain | Aug. 23, 1948 |